United States Patent

[11] 3,571,700

[72] Inventors T. O. Paine
Acting Administrator of the National Aeronautics and Space Administration with respect to an invention of
Charles J. Pellerin, Jr.; Mario H. Acuna, Greenbelt, Md.
[21] Appl. No. 782,544
[22] Filed Dec. 10, 1968
[45] Patented Mar. 23, 1971

[54] TWO-AXIS FLUXGATE MAGNETOMETER
2 Claims, 3 Drawing Figs.
[52] U.S. Cl. ....................................... 324/43
[51] Int. Cl. ....................................... G01r 33/02
[50] Field of Search ............................. 324/43, 47

[56] References Cited
UNITED STATES PATENTS
2,410,039 10/1946 Beach .......................... 324/43
2,389,146 11/1945 Fragola et al. ................. 324/43

OTHER REFERENCES
Geyger, W.; The Ring-Core Magnetometer - A New Type of Second-Harmonic Flux-Gate Magnetometer; AIEE Transactions; Vol 81, Pt I; March 1962, pp 65— 73 (Copy in 324— 43)

Geyger, W; Fluxgate Magnetometer USes Toroidal Core; Electronics, June, 1962; pp 48— 52 (Copy in 324-43)

Ling, S. C.; Fluxgate Magnetometer for Space Application; J. Spacecraft; March-April 1964; Vol 1; No. 2; pp 175— 180 (Copy in 324—43)

*Primary Examiner*—Rudolph V. Rolinec
*Assistant Examiner*—R. J. Corcoran
*Attorneys*—R. F. Kempf, E. Levy and G. T. McCoy ABSTRACT: This disclosure describes a two-axis fluxgate magnetometer. A toroidal sensor that performs both a magnetic sensing function along two axes in a common plane and a magnetic multivibrator function is connected to a pair of phase sensitive detectors. A frequency doubler is connected to the multivibrator to sense the frequency of the multivibrator and to double that frequency. The output from the frequency doubler is connnected to the phase detectors. The phase detectors sense an imbalance in the sense windings of the toroidal core at the second harmonic of the multivibrator frequency. The phase detectors generate DC output signals having a magnitude related to the magnitude of the magnetic field causing the imbalance and a polarity determined by the direction of the magnetic field.

PATENTED MAR 23 1971 3,571,700

INVENTORS
Mario H. Acuna &
Charles J. Pellerin, Jr.

BY

ATTORNEYS

TWO-AXIS FLUXGATE MAGNETOMETER

The invention described herein was made in the performance of work under a NASA contract and is subject to the provisions of Section 305 of the National Aeronautics and Space Act of 1958. Public law 85–568 (72 Stat. 435; 42 U.S.C. 2457)

BACKGROUND OF THE INVENTION

Prior art fluxgate magnetometers have generally been single axis devices. That is, prior art fluxgate magnetometers include a magnetic sensing head (which may be a toroidal-shaped device) for each axis along which a magnetic field is to be sensed. The head or heads are driven by an oscillating device, such as a multivibrator, for example. A magnetic field passing through the sensing head at an appropriate angle causes an imbalance in sense windings wound about the head. This imbalance causes the sense windings to generate a second harmonic signal. The second harmonic signal is usually phase compared with a frequency doubled multivibrator signal. The output from the phase comparison device is a signal that represents the magnitude and direction of the magnetic field passing through the head.

The prior art magnetometers of the type discussed in the preceding paragraph have various disadvantages. One disadvantage is they can only measure a magnetic field along one axis; hence, if it is desired to measure a magnetic field along two or more axes, two or more magnetic sensing heads are necessary. In addition, many prior art magnetometers are unsuitable for some applications because they require relatively large amounts of power. For example, many prior art fluxgate magnetometers are unsuitable for measuring a magnetic field from a spacecraft because of their high power requirements. Moreover, the signal head of many prior art magnetometers is complex and, therefore, costly to manufacture. Furthermore, many prior art magnetometers require an excessive number of components such as a head separate from the multivibrator.

Therefore, it is an object of this invention to provide a new and improved fluxgate magnetometer.

It is also an object of this invention to provide a magnetometer that measures a magnetic field along more than one axis without using more than one sensor head.

It is another object of this invention to provide a magnetometer that is electronically uncomplicated so that it can be inexpensively produced.

It is a further object of this invention to provide a magnetometer wherein the sensor is integral with the magnetic multivibrator, the sensor senses a magnetic field along more than one axis, and the sensor is small and uncomplicated.

SUMMARY OF THE INVENTION

In accordance with a principle of this invention, a two-axis flugate magnetometer is provided. A toroidal sensor that performs both a magnetic sensing function along two axes in a common plane and a magnetic multivibrator function is connected to a phase detector means. The phase detector means is also connected to receive a signal at twice the frequency rate of the multivibrator frequency. The phase detector senses the second harmonic signal generated by the sensor when a magnetic field exists along one or both of the sensed axes. The output from the phase detector means is related to the magnitude and direction of the sensed magnetic field.

In accordance with another principle of this invention, the toroidal sensor includes a toroidal core having circumferential windings and diagonal windings. The circumferential windings are connected to suitable electronic means so that a multivibrator is created. The diagonal windings are connected to the phase detector means and generate a second harmonic signal when a magnetic field exists along one of the axes determined by the direction of the diagonal windings.

In accordance with a still further principle of the invention, a frequency doubler is connected between the magnetic multivibrator and the phase detector to double the output frequency of the multivibrator signal.

It will be appreciated by those skilled in the art and others that the invention is a rather uncomplicated apparatus for sensing a magnetic field along one or both of the two axes. The heart of the invention is a magnetic toroidal device that is an integral part of a sensing system as well as an integral part of a magnetic multivibrator. By merely connecting one set of toroidal device windings through a frequency doubler to a phase detector and a second set directly to the phase detector, a fluxgate magnetic sensing apparatus is provided. Because the apparatus is uncomplex, it is inexpensive to manufacture. In addition, because the sensor is integral with the multivibrator, the expense of producing the device of the invention is reduced. Preferably, the frequency doubler is a 4 diode ring modulator. Hence, a rather simple means for doubling a frequency is also provided by the invention. Moreover, because the device senses along two axes as opposed to a single axis, only a single sensor is necessary to sense a magnetic field along two axes.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
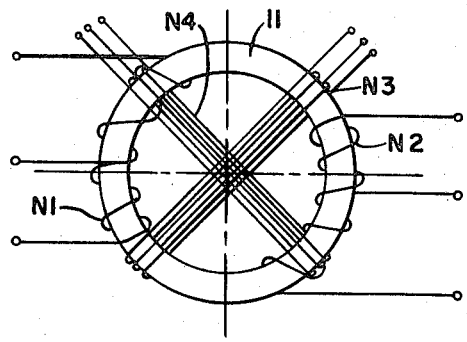
FIG. 1 is a pictorial diagram illustrating the toroidal sensor of the invention.

FIG. 1 is a pictorial diagram illustrating the sensor of the invention and comprises a toroidal core 11. First and second windings N1 and N2 are wound around the circumference of the core. As hereinafter described, the first and second windings $N_1$ and $N_2$ are connected to suitable electronic means so that a multivibrator function is provided. Wound around the core 11 in a diagonal direction and, preferably, at right angles to each other, are third and fourth windings $N_3$ and $N_4$. As hereinafter described, the third and fourth windings, $N_3$ and $N_4$, are sense windings. Preferably, the toroidal core 11 is formed of permalloy.

Figure 2:
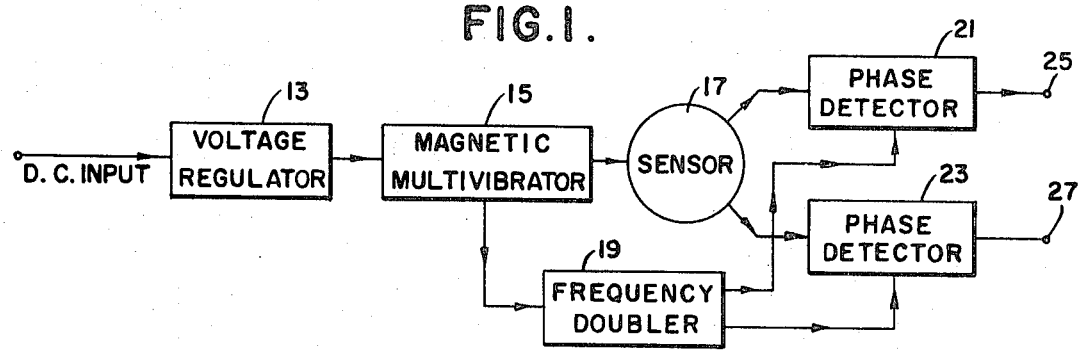
FIG. 2 is a block diagram functionally illustrating the apparatus of the invention.

Prior to discussing the functional operation of the invention as illustrated in FIG. 2, it should be noted that the sensor core illustrated in FIG. 1 is rather uncomplicated and, therefore, inexpensive to manufacture. The sensor merely comprises a permalloy core 11 having four windings. Two of these windings are utilized to perform a multivibrator function, while the other two windings are utilized to sense a magnetic field along two axes. By providing both functions in a single unit, the cost of the overall fluxgate magnetometer is reduced. Moreover, because a single sensor performs the function of two prior art sensors, the cost of the overall system is reduced.

FIG. 2 is a functional block diagram of the magnetometer apparatus of the invention and comprises: a voltage regulator 13; a magnetic multivibrator 15; a sensor 17; a frequency doubler 19; a first phase detector 21; and, a second phase detector 23. A DC input, which may be fluctuating, is connected to the input of the voltage regulator 13. The regulated output of the voltage regulator 13 is connected to the input of the magnetic multivibrator 15. The magnetic multivibrator is connected to windings N1 and N2 of the sensor 17, better illustrated in FIG. 1. The output of the magnetic multivibrator is also connected to the input of the frequency doubler 19. The frequency doubler 19 generates a pair of outputs which are connected to the reference inputs of the first and second phase detectors 21 and 23. Windings N3 and N4 (FIG. 1) of the sensor 17 are separately connected to the signal inputs of the first and second phase detectors 21 and 23. The outputs of the phase detectors are connected to first and second output terminals 25 and 27.

In operation, the magnetic multivibrator 15 provides the alternating magnetic flux necessary to alternately drive the core 11 into saturation in opposite directions. This is done in a conventional manner by switching a pair of switches, such as transistors, on and off at a rate determined by: the permalloy core; the number of turns in the windings in N1 and N2; and, the level of the voltage applied by the regulator 13. The square wave produced by the magnetic multivibrator 15 is doubled by the frequency doubler 19 and applied as a reference signal to the phase detectors 21 and 23.

In accordance with the general principle of operation of a fluxgate magnetometer, a second harmonic signal proportional to the external field along the axes of sense windings N3 and N4 is induced in windings N3 and N4. These signals are applied to the signal inputs of the first and second phase detectors 21 and 23.

The phase detectors compare the second harmonic signals from windings N3 and N4 with the reference signals from the frequency doubler 19. In addition, the phase detectors rectify the signal so that a DC voltage proportional to the strength of the magnetic field occurs at the first and second output terminals 25 and 27. Moreover, the output signals at the output terminals are positive or negative, depending upon the direction of the magnetic field sensed by windings N3 and N4. Hence, the output signals indicate both the magnitude and the direction of the fields sensed along both axes.

It will be appreciated by those skilled in the art and others that by placing the windings as illustrated in FIG. 1, only the second harmonic signal is induced in the sense windings N3 and N4. That is, because these windings see field components that are 90° apart, there is no coupling between them. In fact, in a laboratory prototype made in accordance with the invention, a coupling of less than −40 db. was observed.

Figure 3:
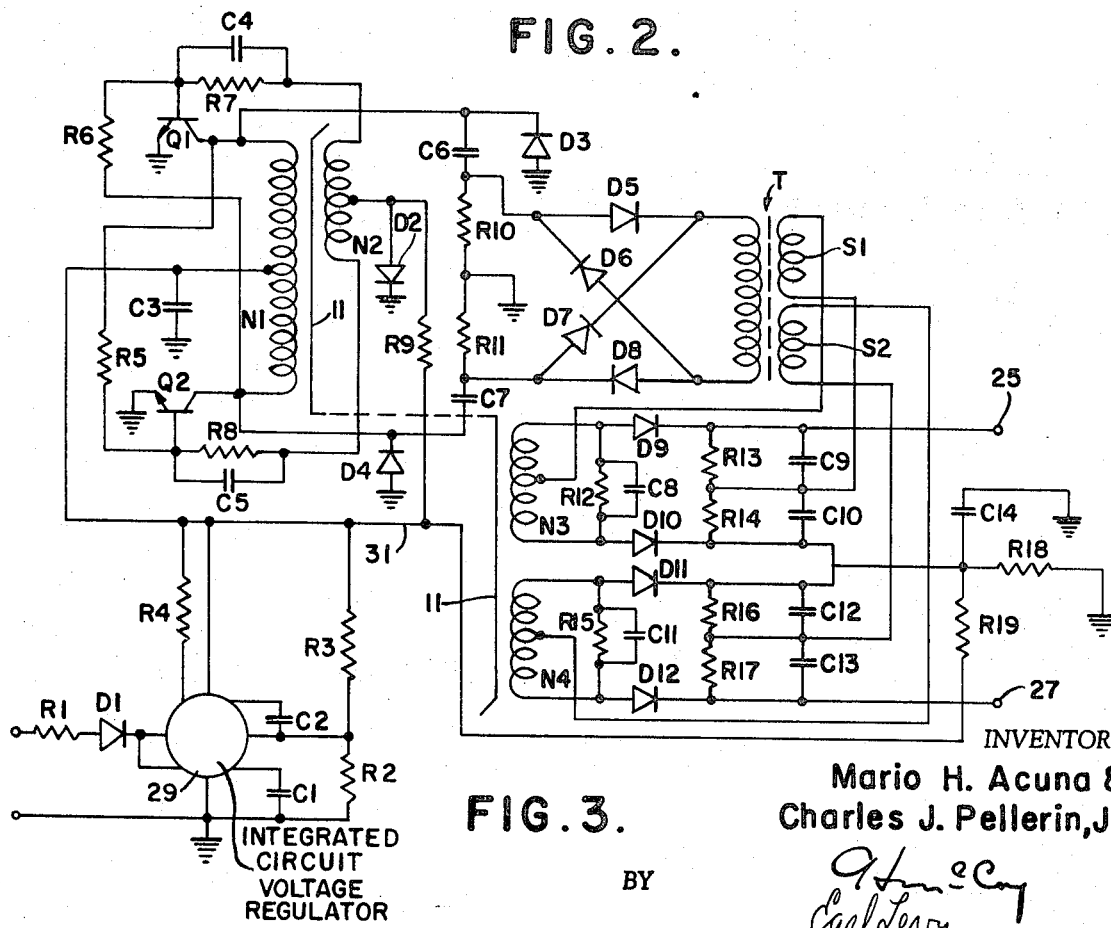
FIG. 3 is a schematic diagram of an embodiment of the invention suitable for carrying out the functions illustrated in FIG. 2.

FIG. 3 is a schematic diagram illustrating an electronic circuit suitable for carrying out the functions of the invention illustrated in FIG. 2. The circuit illustrated in FIG. 3 comprises: two NPN transistors designated Q1 and Q2; 12 diodes designated D1 through D12; one transformer designated T; 14 capacitors designated C1 through C14; and, 19 resistors designated R1 through R19.

A DC input terminal is connected through R1 in series with D1 to inputs of a voltage regulator 29. The voltage regulator may be an integrated circuit such as the LM–200 or the LM–300, made by the National Semiconductor Company. A second input of the regulator is connected to ground. A third input of the regulator is connected through C1 to ground and a fourth input of the regulator is connected through R2 to ground and through R3 to a voltage bus 31. The junction between R2 and R3 is connected through C2 to a further input of the regulator. One more input of the regulator is directly connected to the voltage bus 31 and a still further input is connected through R4 to the voltage bus. The regulator 29 and its associated circuitry regulates the voltage at the DC terminal in a conventional manner.

The voltage bus 31 is connected to the center tap of winding N1 and through C3 to ground. The emitters of Q1 and Q2 are connected to ground. The collector of Q1 is connected to one end of N1 and the collector of N2 is connected to the other end of N1. The collector of Q1 is connected through R5 to the base of Q2 and the collector of Q2 is connected through R6 to the base of Q1. The base of Q1 is connected through R7 to one end of N2. Connected in parallel with R7 is C4. The base of Q2 is connected through R8 to the other end of N2 and C5 is connected in parallel with R8. The center tap of N2 is connected through D2 to ground and through R9 to the voltage bus 31. One end of N1 is connected through C6 in series with R10, R11 and C7 to the other end of N1. One end of N1 is connected through D3 to ground and the other end of N1 is connected through D4 to ground. The junction between the R10 and R11 is also connected to ground.

The junction between C6 and R10 is connected to the anode of D5 and the cathode of D6. The junction between C7 and R11 is connected to the anode of D7 and the cathode of D8. It should be noted that C6–R10 and C7–R11 comprise a differentiator whose values are selected to convert the square wave output of the multivibrator to a pulse waveform. The cathode of D5 is connected to the cathode of D7 and to one end of the primary winding of T. The anode of D6 is connected to the anode of D8 and to the other side of the primary winding of T.

T has a pair of secondary windings designated S1 and S2. One end of S1 is connected to the center tap of N3 and one end of S2 is connected to the center tap of N4. One end of N3 is connected to the anode of D9 and through R12 to the other end of N3. The other end of N3 is connected to the anode of D10. C8 is connected to the anode of D10. C8 is connected in parallel with R12. The cathode of D9 is connected through R13 in series with R14 to the cathode of D10. C9 is connected in parallel with R13 and C10 is connected in parallel with R14. The junction between R13 and R14 is connected to the other side of S1.

One end of N4 is connected to the anode of D11 through R15 to the other side of N4. The other side of N4 is connected to the anode of D12. C11 is connected in parallel with R15. The cathode of D11 is connected through R16 in series with R17 to the cathode of D12. C11 is connected in parallel with R16 and C12 is connected in parallel with R17. The junction between R16 and R17 is connected to the other side of the S2.

The cathode of D9 is connected to the first output terminal 25 and the cathode of D12 is connected to the second output terminal 27. The cathodes of D10 and D11 are connected together and: through R18 to ground; through R19 to the bus 31; and, through C14 to ground.

In operation, the voltage regulator 29 in combination with its associated diode, resistors, and capacitors applies a regulated input voltage to the voltage bus 31. Winding N2 by being connected to the bases of Q1 and Q2 controls the switching of Q1 and Q2. That is, N2 causes Q1 and Q2 to alternately switch on and off as core 11 is saturated in one direction and then in the other direction. This switching on and off energizes N1 in one direction and then in the other direction. And the direction of current flow in N1 controls the direction of saturation in the core 11. Hence, N1 and N2 and Q1 and Q2 along with their associated resistors, capacitors, and diodes form an inverter or multivibrator circuit depending upon the terminology used. The alternating signal in N1 is sensed by the diode bridge consisting of D5, D6, D7 and D8. The diode bridge generates a pulsating output signal at twice the frequency of the N1 alternating signal. This signal is sensed by the S1 and S2 windings of T1 and is applied to the phase detector circuits as a reference signal. The phase detector circuits comprise the diodes, capacitors and resistors connected to the N3 and N4 windings. The phase detectors compare the signals from T with the signals from N3 and N4.

The N3 and N4 signals are created by the N3 and N4 windings cutting a magnetic field. The diodes D9, D10, D11 and D12 forming a part of the phase detectors rectify the comparison signals. The rectified comparison signals are applied to the output terminals 25 and 27. The output signals have a voltage level related to the magnitude of the magnetic field sensed by windings N3 or N4. In addition, the output signals have polarity determined by the direction of the magnetic field sensed by that windings (N3 or N4).

It will be appreciated by those skilled in the art and others that the embodiment of the invention illustrated in FIG. 3 is electronically uncomplicated. By making the sensor integral with the multivibrator, the number of overall components necessary for carrying out both functions is reduced. In addition, by utilizing a single toroidal sensor to sense a magnetic field along two axes, a device for sensing a magnetic field along two axes becomes less complicated, i.e., one, not two, sensors can be used. Hence, because of the reduction in complexity and components, the overall cost of the apparatus for sensing a magnetic field along two axes is reduced. Moreover, the toroidal core illustrated in FIG. 1 can be made considerably smaller than prior art magnetometer sensors. Hence, the invention can be utilized in environments where prior art sensors could not be used because of their size. Moreover, because the complexity of the electronic circuitry involved is reduced, the power requirements of the system are reduced. Hence, the invention can be utilized in remote environments where power sources are limited, such as on a spacecraft, for example.

It will be appreciated by those skilled in the art and others that the foregoing has only described a preferred embodiment of the invention and that other embodiments fall within the scope of that description. For example, it will be appreciated by those skilled in the art and others that the invention as functionally illustrated in FIG. 2 can be carried out by apparatus other than that illustrated in FIG. 3. Hence, the invention can be practical otherwise than as specifically described herein.

We claim:

1. A two-axis fluxgate magnetometer comprising:
   a sensor, said sensor having a toroidal core, a first winding wound around the circumference of said core, a second winding also wound around the circumference of said core, a third winding wound diametrically across said core and a fourth winding wound diametrically across said core and perpendicular to said third winding;
   a DC source and a voltage regulator coupled to the output of said source;
   multivibrator means connected to the output of said voltage regulator, said multivibrator generating a square wave and connected to said first and second windings to alternately switch a magnetic flux through said toroidal core;
   means coupled to said multivibrator for differentiating the square output of the multivibrator;
   frequency doubler means connected to said differentiating means; and
   detector means connected to said third and fourth windings and coupled to said frequency doubler means to detect a signal induced in said third and fourth windings when an external magnetic field passes through said third and fourth windings.

2. A two-axis fluxgate magnetometer as claimed in claim 1 wherein said detector means comprises a first phase detector having one input connected to said third winding and a second input connected to said frequency doubler; and a second phase detector having one input connected to said fourth winding and a second input connected to said frequency doubler.